United States Patent
Doney

(10) Patent No.: US 11,954,212 B2
(45) Date of Patent: Apr. 9, 2024

(54) METHOD, APPARATUS, AND COMPUTER-READABLE MEDIUM FOR CONFEDERATED RIGHTS AND HIERARCHICAL KEY MANAGEMENT

(71) Applicant: SECURRENCY, INC., Annapolis, MD (US)

(72) Inventor: George Daniel Doney, Annapolis, MD (US)

(73) Assignee: SECURRENCY, INC., Annapolis, MD (US)

( * ) Notice: Subject to any disclaimer, the term of this patent is extended or adjusted under 35 U.S.C. 154(b) by 440 days.

(21) Appl. No.: 17/344,275

(22) Filed: Jun. 10, 2021

(65) Prior Publication Data

US 2021/0390191 A1    Dec. 16, 2021

Related U.S. Application Data

(60) Provisional application No. 63/037,034, filed on Jun. 10, 2020.

(51) Int. Cl.
| | |
|---|---|
| *G06F 21/60* | (2013.01) |
| *G06F 16/27* | (2019.01) |
| *G06Q 20/36* | (2012.01) |
| *G06Q 20/38* | (2012.01) |
| *G06Q 20/40* | (2012.01) |
| *H04L 9/00* | (2022.01) |
| *H04L 9/08* | (2006.01) |
| *H04L 9/32* | (2006.01) |

(52) U.S. Cl.
CPC ............ *G06F 21/604* (2013.01); *G06F 16/27* (2019.01); *G06Q 20/3674* (2013.01); *G06Q 20/38215* (2013.01); *G06Q 20/3825* (2013.01); *G06Q 20/3829* (2013.01); *G06Q 20/389* (2013.01); *G06Q 20/4016* (2013.01); *H04L 9/0894* (2013.01); *H04L 9/3247* (2013.01); *G06F 2221/2141* (2013.01); *H04L 9/50* (2022.05)

(58) Field of Classification Search
CPC .......... G06F 21/604; G06F 16/27; G06F 2221/2141; G06Q 20/3674; G06Q 20/38215; G06Q 20/3825; G06Q 20/3829; G06Q 20/389; G06Q 20/4016; H04L 9/0894; H04L 9/3247; H04L 9/50
See application file for complete search history.

(56) References Cited

U.S. PATENT DOCUMENTS

| | | | |
|---|---|---|---|
| 10,489,597 B2 | 11/2019 | Safford et al. | |
| 10,540,654 B1* | 1/2020 | James | .......... G06Q 20/223 |
| 10,673,626 B2 | 6/2020 | Sandberg-Maitland et al. | |
| 10,735,202 B2 | 8/2020 | Jayachandran et al. | |
| 11,159,307 B2 | 10/2021 | Bathen et al. | |

(Continued)

OTHER PUBLICATIONS

International Searching Authority, International Search Report and Written Opinion for PCT application No. PCT/US21/36826 dated Sep. 15, 2021.

*Primary Examiner* — Techane Gergiso
(74) *Attorney, Agent, or Firm* — NEO IP

(57) ABSTRACT

A method and apparatus for secured, peer-to-peer transfer of data rights over a computer network, the method being accomplished by a distributed computing system including a distributed ledger platform. Root rights are defined and delegated to wallets in a multilevel manner to thereby isolate wallets associated with the root right from cyber risk.

20 Claims, 9 Drawing Sheets

(56) References Cited

U.S. PATENT DOCUMENTS

| | | |
|---|---|---|
| 11,200,569 B1 * | 12/2021 | James .................. G06Q 20/381 |
| 11,250,423 B2 | 2/2022 | Heyner |
| 11,250,466 B2 | 2/2022 | Soundararajan et al. |
| 11,308,487 B1 * | 4/2022 | Foster ................ G06Q 20/3829 |
| 11,755,998 B2 * | 9/2023 | Malvankar .............. G06F 16/93 |
| | | 705/301 |
| 2019/0294817 A1 | 9/2019 | Hennebert et al. |
| 2019/0372786 A1 * | 12/2019 | Ra .......................... G06F 21/30 |
| 2020/0117690 A1 * | 4/2020 | Tran ................. G06F 16/90332 |
| 2020/0151842 A1 * | 5/2020 | O'Brien .............. G07F 17/3276 |
| 2020/0226123 A1 * | 7/2020 | Nixon ............. G05B 19/41855 |
| 2020/0250295 A1 * | 8/2020 | Padmanabhan ....... H04L 63/102 |
| 2020/0334674 A1 * | 10/2020 | Youngblood .......... G06Q 20/36 |
| 2020/0334773 A1 * | 10/2020 | Spangenberg ....... G06Q 50/184 |
| 2020/0344132 A1 * | 10/2020 | Padmanabhan ....... H04L 9/0637 |
| 2020/0344233 A1 * | 10/2020 | Lai .................... G06Q 20/4014 |
| 2021/0377263 A1 | 12/2021 | Law |
| 2022/0051261 A1 | 2/2022 | Vetas |
| 2022/0101326 A1 * | 3/2022 | Kim ................... H04L 63/0464 |

\* cited by examiner

METHOD, APPARATUS, AND COMPUTER-READABLE MEDIUM FOR CONFEDERATED RIGHTS AND HIERARCHICAL KEY MANAGEMENT

RELATED APPLICATION DATA

This application claims priority to U.S. Provisional Application No. 63/037,034 filed on Jun. 10, 2020, the entire disclosure of which is incorporated herein by reference.

FIELD OF THE INVENTION

The invention relates to systems, data structures and processes for cryptographic key management that increase security and transaction flexibility in decentralized computer networks to enable value protection and transaction recovery.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Decentralized networks (also known as Distributed Ledger Technology (DLT)), such as networks based on blockchain protocols, provide a powerful baseline for trustless transactions between parties. As a technology, decentralized networks provide two powerful enablers for a financial ecosystem; 1) consensus immutability and 2) decentralized authority. Through consensus immutability, all parties can be confident that transactions have been recorded properly and cannot later be changed. Decentralized authority enables actors to execute their rights without the need for intermediaries such as banks and government institutions.

As powerful as these enablers are, they are not sufficient, by themselves, to cover all requirements for commerce in a complex financial ecosystem. To be widely adopted, trustless transaction computer networking infrastructures must be augmented to incorporate elements of trust and authority that are inherent in disclosures and representations of value, implied permissions in a group context, and collaboration between entities. As an example, consider a basic challenge. Trustless blockchain instruments like Bitcoin are bearer instruments. Only the party possessing the secret to a public address containing Bitcoin may exercise ownership rights (in this case the right to transmit) on this value. The principal benefit of this model is the ability to conduct transactions of any size without intermediaries, thereby ensuring that these transactions are "censorship free." However, with this benefit comes a significant risk. There is no recourse in the event of lost or misappropriated custody. If the key to a "wallet" (a public/private key combination used to affect state changes on a distributed ledger) is lost or stolen, there is no mechanism for value recovery.

History has shown that bearer instruments create "might makes right" conditions, that is "if you can take it, you own it." Cash (paper money) is an example as theft can be common in places where people must carry cash. Due to the irreversibility of blockchain transactions, it can be difficult, or even impossible, for authorities to recover stolen value. As a result, Bitcoin is the preferred currency for certain extortion methods, such as "ransomware," where an attacker encrypts the victim's data and only provides the decryption key upon a transfer of cryptocurrency to a wallet associated with the attacker. Of course, a lack of recourse in the face of misappropriation is the antithesis of the core values of a fair financial ecosystem. As a result, owners of blockchain value often turn to custodians to protect their value. When owners turn to intermediaries, the system is not fundamentally different than the centralized systems many blockchain advocates seek to replace.

SUMMARY

The above-noted limitations raise the need for a way to define and exercise curation rights (e.g., a mechanism to reverse illicit transactions or recover lost value among other things) while retaining consensus, immutability and decentralized authority, the technical hallmarks of decentralized networks. Extending a trustless system to incorporate trust requires a layered rights governance structure that allows independent entities to define, share, and transact via rights, policies, and contracts. The disclosure herein articulates a network architecture and data model designed to prevent rights from being extinguished by force, by theft, or by accident. The disclosed implementations enable participants to conduct transactions without intermediaries, thus preserving the benefits of decentralized networks, while protecting against cyber threats and providing recourse for misappropriation. The disclosed implementations leverage 2 foundational technical innovations: 1) a mechanism to mitigate or eliminate cyber threats for recovery of core rights ("hierarchical key management"); and 2) a framework to establish, convey, and enforce rights without a central authority ("confederated rights management"). These two innovations can be linked to provide a decentralized computer network overcoming limitations of the prior art.

The bearer instrument problem for a blockchain-based asset, known as a "token," can be resolved by introducing a Transfer Agent, that is, a party who has the right to reverse a transaction or "claw-back" value for an illicit or mistaken transaction. A mechanism must be provided for determination of this right for a particular asset. A stakeholder must be able to know that the party given the Transfer Agent right is trustworthy and qualified (e.g., has a legal right, can be held accountable if the right is misused, and is fully aware of responsibilities). Further, the possibility that the Transfer Agent is compromised, becomes insolvent, or is incompetent must be addressed.

In pursuing technical solutions to each of these issues regarding token transfers, a deeper approach to rights in general must be developed that can be applied broadly across any context. Confederated rights management, a technical approach that allows parties to form coalitions (groups of two or more parties who agree to define and apply a right voluntarily) rather than through centralized or federated models, is disclosed herein. Confederated rights management protects the decentralized benefits of blockchain while allowing coalitions to form and dissolve freely.

It is important to understand the difference between "federated" and "confederated" management models. In federated rights models, parties join in an arrangement where sovereignty, the ability to define and assign rights, rests with the newly created entity. Confederated models, on the other hand, are characterized by a coalition approach where parties are free to agree or disagree on the definition or assignment of rights. To transact with each other effectively in a confederated model, constituents need only agree on what it means to be a right and how a right is conveyed. Parties are free to join common definitions and control of rights and are equally free to disagree or leave any control model.

Blockchain networks are examples of a simple confederated rights model. The basic right encoded in these networks is the right to sign a transaction, that is, the right to authorize a state change in the network. By participating, constituents agree, at least implicitly, to the basic structure by which rights are expressed and conveyed (network governance). However, collaboration requires trust, which requires a framework built on top of trustless distributed ledger systems. A confederated rights model in accordance with disclosed implementations supports, but does not mandate, federation, i.e., binding agreements between parties in a coalition that cannot be exited without consequence. But the development of lasting, large scale rights requires a mechanism by which coalitions can quickly form and dissolve coalition agreements to achieve mutual benefit.

In a confederated rights framework of the disclosed implementations, any assignment of rights or trustworthiness can be relative. Participants can decide whether a particular right, policy, contract, or object is managed in a way that benefits the participant. This requires a technology protocol and data model that enables attributes, policies, contracts, entities (individuals or groups), and objects to be defined by the coalition.

Returning to the implementation of a Transfer Agent right, a confederated rights management approach can be applied using the disclosed implementations. Within the context of a cryptographic token, or other digital token, a Transfer Agent right may be applied by a responsible party. On creation of a token, the party defaults to the issuer, who has the right to manage rights within the context of a token. Only qualified parties may obtain the issuer right (the issuer qualification process can be implemented in its own confederated model). The issuer may transfer the right to manage rights to the token holders, who may exercise their rights through a consensus vote or a self-sovereign token model. The holder of the manager right may assign a Transfer Agent from a list of candidates who have been qualified (again through a confederated model) to hold the right. If compromised or ineffective, the Transfer Agent role can be reassigned by the party holding the manager right.

In the event that the party holding the Manager right (in the context of a token, this is a "root" right) is compromised, resolving the root right challenge requires an innovative technical mechanism to protect against compromise or loss of a root right. The solution needs to solve the Custody Paradox: the fact that all network actions present cyber and operational risk but infrequent actions limit utility of function. In other words, the only safe right is one that is never used. This custody paradox has made the blockchain industry difficult to insure as cyber risk is nearly impossible to assess. The principal solution to mitigate cyber risk is exercising authority through signing ceremonies, a high assurance process that involves independent entities participating together in secure locations in authorizing a transaction. But this process is slow and expensive—by design to mitigate cyber risk. Making the process faster introduces risk. This problem has limited the utility of blockchain because there is no middle ground between wallets that are "hot" (fast/risky) or "cold" (slow/expensive).

The concept of "layered wallets" is used in the disclosed implementations to resolve this paradox through delegation. Through such delegation, a root wallet can remain inactive while delegating its authority (repeatedly if needed) to wallets that can accept the cyber risk required to sign a transaction. The authority can be reclaimed in the event of compromise or misuse of a delegated right. Layering produces the desired model as authority can be expressed via hot wallet for fast and reversible transactions, which, if compromised, can be recovered or reversed by exercising authority via a cold wallet. The only requirement for exercise of authority from the cold wallet is recovery of the delegated right in the event of compromise, which presumably occurs infrequently. If recovery is frequent, the delegation model may be repeated as often a necessary to ensure that the root is unlikely to ever be used. This model assumes that the root is stored with the highest level of assurance. Since the structure can prevent its use, cyber risk is mitigated limiting the risk exposure of transaction participants.

One aspect of the invention is a method for secure authorization of data transactions represented as state changes in a decentralized computing network including a distributed ledger platform, the method comprising: creating a root right expressed in smart contract code executing on the decentralized computing network, the root right permitting the execution of specified functions to thereby create an immutable right; delegating a right to permit at least one of the specified functions from the root right to a wallet on the decentralized network to create a delegated right allowing the wallet to have rights to sign transactions corresponding to the at least one of the functions, wherein the delegated right can be revoked or reassigned by the root right; recording a data structure in a delegation registry that represents the delegating of a right; and authorizing a transaction on the decentralized computing network by signing the transaction with the wallet to thereby exercise the wallet rights.

DETAILED DESCRIPTION

Figure 1:
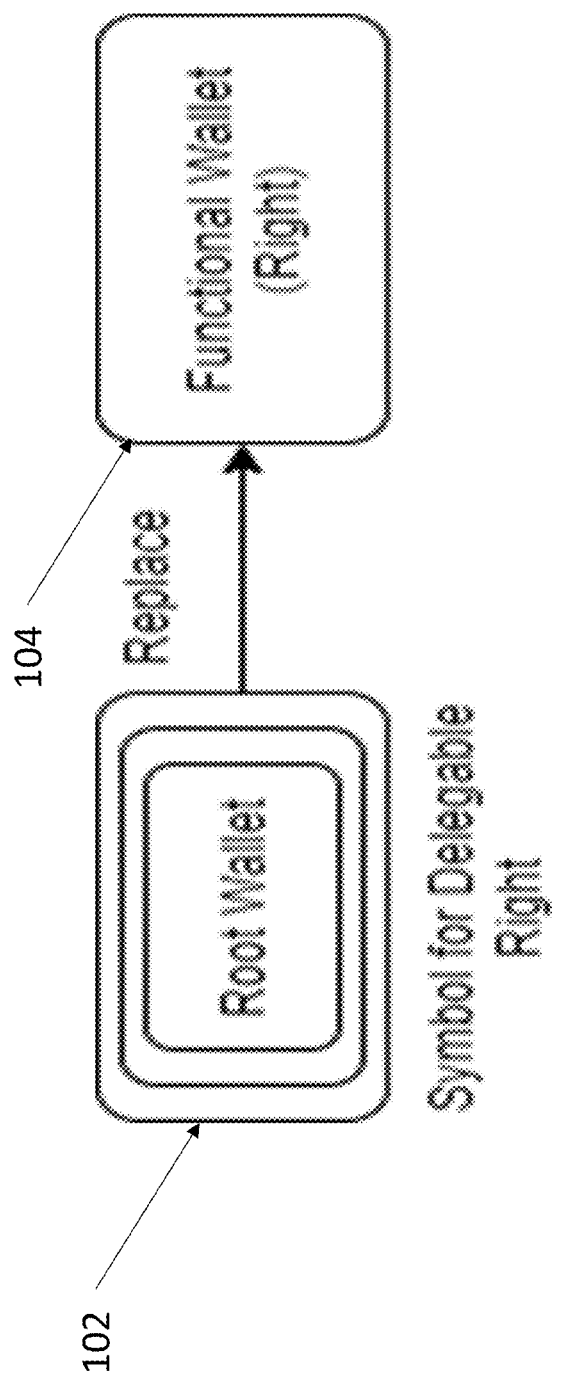
FIG. 1 is an example of symbology used herein in subsequent diagrams to depict a Root Right and delegation structure of disclosed implementations.

Disclosed implementations leverage "cryptocurrency wallets" and "smart contracts." A crypto currency wallet, or just "wallet," is a device, physical medium, program or a service which stores the public and/or private keys for cryptocurrency transactions. A wallet can be created through the generation of a theoretical or random number with a length depending on the algorithm size. The number is then converted to a private key using the specific requirements of the cryptocurrency cryptography algorithm requirement. A public key is then generated from the private key using whichever cryptographic algorithm requirements are required. The private key is utilized by the owner to access and send cryptocurrency and is private to the owner, whereas the public key is to be shared to any third party to receive cryptocurrency. "Smart contracts," are executable code stored and executed at least in part on a decentralized network such as a blockchain. Within a Smart Contract, the right for the owner of a wallet (i.e., a party or parties who possess the secret required to sign a transaction) to perform a function (i.e., cause a state change on a distributed ledger of the network) can be determined by code. The code can evaluate the right to perform a function based on data that can be written immutably on the distributed ledger. For example, a party may desire to send tokens from one distributed ledger address (wallet) to another, e.g., a state change affected by executing the ERC-20 "TransferFrom" function on the Ethereum ledger. On posting the signed transaction to the Ethereum ledger, the signer's right to execute the function can be determined by the smart contract code by, in a simple example, consulting with a list of addresses (white list) authorized to conduct transfers. This list is data stored on the distributed ledger and managed by an authorizing party for transactions, a standard practice well understood by practitioners in the art. When a transaction is signed, the smart contract can validate that the signer is an authorized party based on a match between the public address of the signer and the data defining the right.

Another example of authorization pertains to token issuance, i.e., the right to create new units of a token. This right is particularly sensitive since the party who holds this right has a responsibility to all tokenholders to exercise the right only under authorized conditions to prevent undesirable dilution of tokenholder value. The Token Creator (i.e., the party that signed the transaction that deployed the Token's smart contract) may be afforded the right to issue more tokens. On creation, the Token smart contract may store data recording the Token Creator's public address. When the Issue function is called, the smart contract may evaluate whether the signer is the Creator's address, and, if so, may allow the transaction to proceed. The table and pseudocode below illustrate this functionality.

| Internal Storage | |
|---|---|
| | Value |
| Creator | 0x1234 |

```
function issue(address signer, unit amount) {
    if (signer==Creator) {
        //do something
    } else
    {throw error;}
}
```

This basic pseudocode is common in Role Based Systems. With the power of immutability and decentralized authority afforded by decentralized networks, this simple sequence provides considerable flexibility to manage rights without a centralized administrator. However, this power could result in unrecoverable loss (in this case value dilution) if the address associated with a right is lost or compromised. If the secret to the wallet associated with the Creator right is lost or stolen, no party will be able to perform the desired function, potentially rendering the value associated with the smart contract useless. Each time the Creator exercises its authority (signs a transaction), there is a possibility of key compromise due to cyber-attack. These important "system" rights are referred to as "Root" rights" herein. An innovative technical mechanism is needed to protect the unrecoverable nature of Root rights by mitigating the likelihood of loss of control without sacrificing decentralization of signature authority.

In the disclosed implementations, Root rights are named rights assigned based on values stored as immutable data that can be set on creation of a smart contract or in another manner. As described above, a smart contract may store its creator and consult with this property to authorize functions protected by the Creator right. Since Root rights cannot be changed, if the wallet associated with this right is compromised, it creates conditions for unrecoverable loss of value. To protect the creating wallet from compromise, the smart contract may implement the IDelegableRights interface and smart contract described below. This interface enables Root rights to be delegated such that "throw away" wallets can be used to exercise the authority and if compromised, these wallets can be discarded and/or replaced.

A separate smart contract can be dedicated to the protection of Root rights. A DelegatesRegistry, a set of data structures stored as a table or other database, allows Root rights to be delegated one or more times, creating a "layered" wallet structure for risk management. An example of a basic data structure for the DelegatesRegistry is shown below.

| Contract | Right | Parent | Delegate |
|---|---|---|---|
| 0xaabbccdd | Creator | 0x1234 | 0x5678 |

In this data structure, Contract represents the smart contract through which the Root right is being executed and where the Root address is recorded, Right is the right protected by this contract, Parent is the address delegating the right, and Delegate is the address to whom this right has been assigned. In the displayed data the Creator right for Contract 0xaabbccdd has been assigned by the root wallet 0x1234 to a delegate 0x5678.

Assume an example in which the Issue function in the IDelegableRights smart contract is protected such that only the Creator may execute this function. If the Issue function is called, the smart contract first checks to see if the signer is the Creator. If not, the contract checks the DelegatesRegistry to see if the Creator right for the IDelegableRights contract has been delegated and the signer is a delegate returning true if the signer is a delegate.

As is apparent from the above, the DelegatesRegistry stores delegation records as data structures in a database. This registry is operated by Smart Contracts that implement the IDelegableRight interface, referred to herein as "Execution" contracts. All delegation records are marked with the Smart Contract that created the record to prevent smart contracts from affecting rights delegation of other smart contracts. As an example, the IDelegableRight interface can support 3 calls: Delegate(right, wallet); Replace(right, wallet, newWallet); and Subsume(right, wallet).

FIG. 1 illustrates symbology used herein in subsequent diagrams to depict a Root Right and delegation structure. The delegable right of the Root Wallet is represented at 102 and the functional wallet is represented at 104. SmartContracts implementing the IDelegableRight interface use the DelegatesRegistry database to enable Root rights to be delegated one or more times, creating a Layered Wallet structure for risk management.

To delegate rights, a party holding the right signs an IDelegableRight. Delegate function via the Executing Contract (the specific smart contract that executes specific the function protected by the right). The Executing Contract verifies that the caller has the right it is attempting to delegate then calls the DelegatesRegistry to delegate the right through recordation in the DelegatesRegistry database (for the sample data above used to delegate the Creator right this corresponds to: Delegate('Creator', 0x5678) where 0x1234 signed the transaction as Creator via the 0xaabbccdd Execution contract). The rights delegation in this example can be recorded as the table entry data structure below.

DelegateRegistry Entry: Right='Creator'; Parent=0x1234 [W]; Delegate=0x5678 [W]; Contract=0xaabbccdd [SC]

Through this assignment, the Delegate Wallet now has the right of the parent in the context of the Executing Contract. Delegation separates the Root Wallet from a functional wallet that executes functions. Delegation protects the Root Wallet from cyber risk associated with use since its delegate is signing transactions on its behalf. Note that the strength of the delegation model depends on independent custody of the delegate wallet's private key, since an attack that compromises both wallets could undermine the impact of the disclosed model.

In the event of compromise of the Delegate Wallet, the Root Wallet can restore control by replacing the Delegate Wallet. Also, the Root Wallet may regain this right by subsuming the Delegate Wallet as described in detail below. To remove a Delegate Wallet's right, a party with the Right calls the IDelegableRight.Subsume function from the Executing Contract. For example, to remove the right assigned in the previous example, the function Subsume ('Creator', 0x5678) would be executed, removing this row from the table and preventing 0x5678 from executing this right on behalf of the Executing Contract's Creator.

Multiple layers of delegation can be applied to prevent compromise of a Root Wallet if, for example, delegate replacement happens frequently. In one strategy to mitigate any cyber risk of Root Wallet compromise, the Root right is only utilized twice, once for smart contract creation and a second time to delegate this right to a wallet used to execute the right and/or further delegate the right. If meaningful risk of compromise exists for a delegated right, the rights can be delegated a second time, a third time, etc. . . . since delegate recovery involves signing a transaction by a supervisor wallet (i.e., a wallet higher in the delegation chain). To ensure no cyber risk is incurred by the Root Wallet, the delegation should occur with as many layers as required to ensure the Root Wallet right is not utilized in restoration, thereby protecting the Root Wallet from cyber risk.

Figure 2:
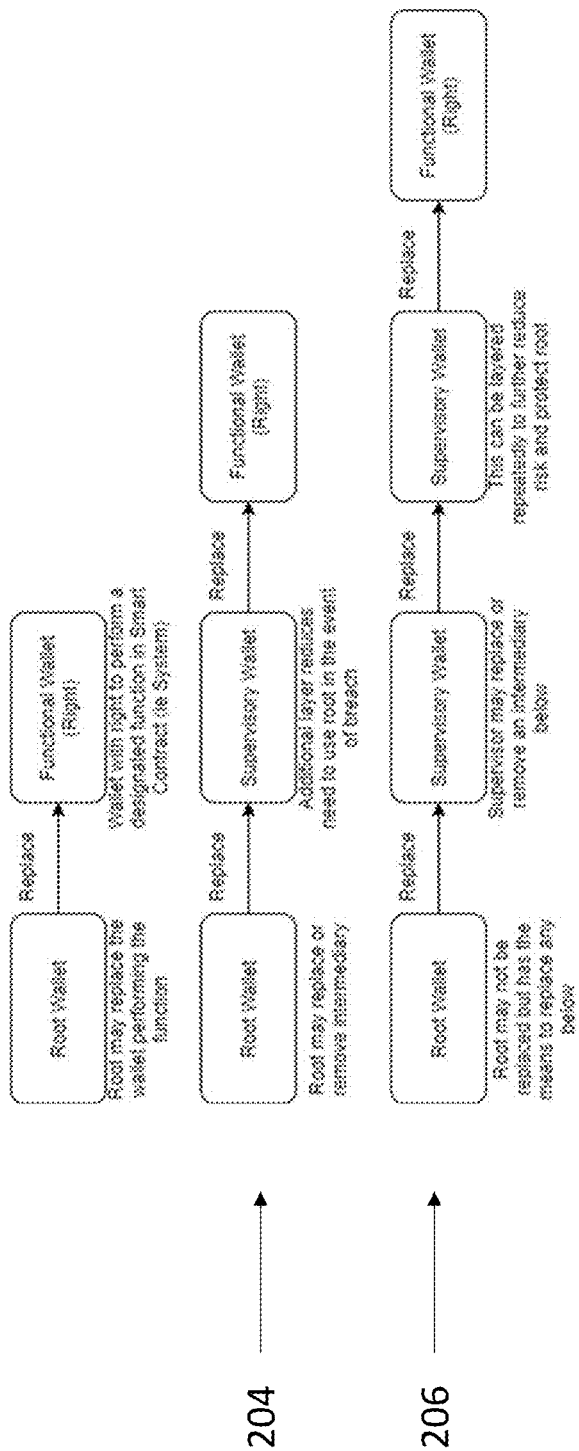
FIG. 2 is a schematic representation of patterns of layered delegation in accordance with disclosed implementations.

FIG. 2 illustrate patterns of layered delegation. At 202, the Root Wallet has delegated a right to a functional wallet. The Root may later Replace the functional wallet or Subsume (revoke) the delegation. At 204, the wallet that has received the delegation in 202 further delegates the right, thereby acting as a "supervisor" to another wallet which is used to exercise the functional right. At 206, the supervisory wallet can delegate its role creating an additional layer protecting the root. A wallet can replace any wallet below it in the chain/layer. Of course, all actions are recorded in the DelegatesRegistry.

Figure 3:
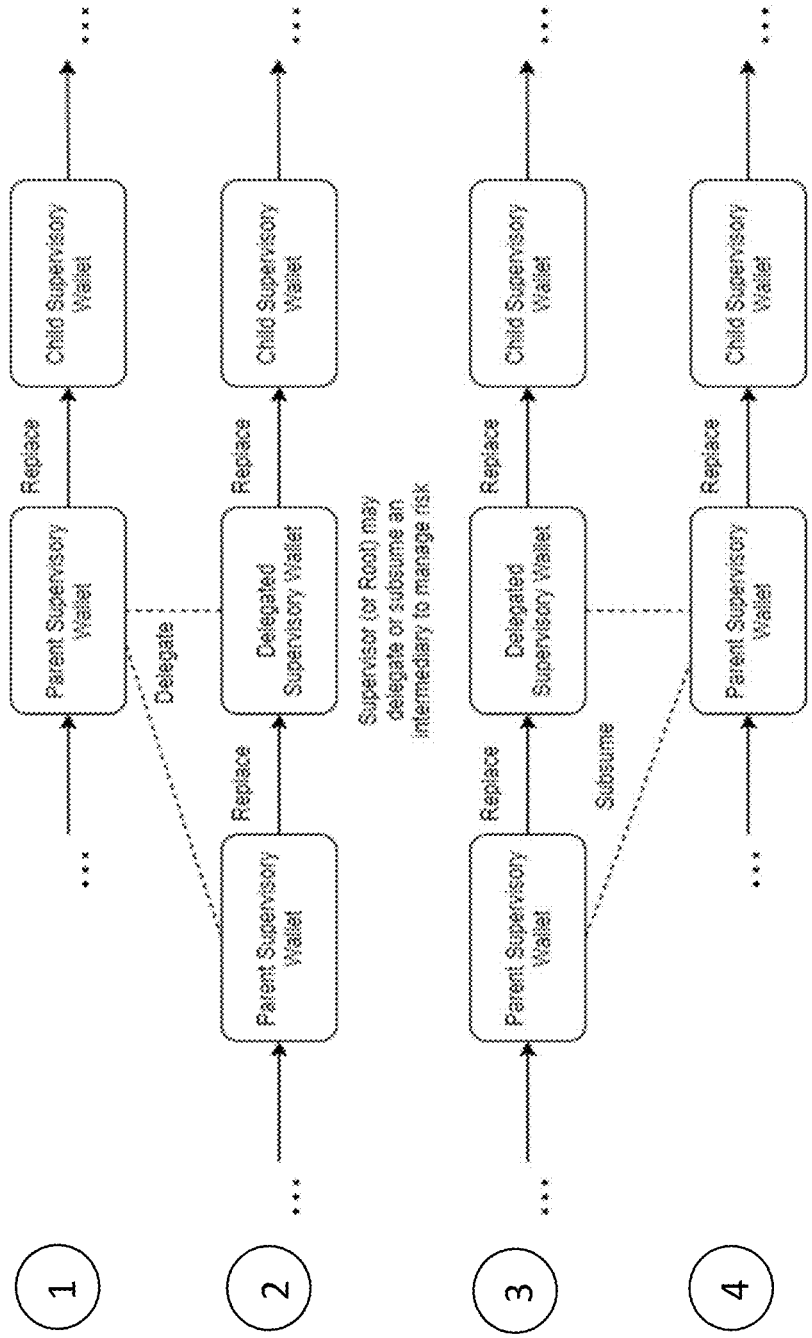
FIG. 3 is a schematic illustration of an example of a sequence of operations based on layered wallet management in accordance with disclosed implementations.

FIG. 3 illustrates an example of a sequence of operations based on layered wallet management. Each row of FIG. 3 represents a state of rights delegation. At 1, Root delegates Creator right for System attribute to a Parent Supervisory Wallet ("WarmRoot") which results in an entry in the DelegateRegistry of:

Right=Creator; Parent=Root[W]; Delegate=WarmRoot[W];
Contract=AttributeRegistry[SC]

At 2, Warm Root delegates Creator right to a Delegated Supervisory Wallet ("HotRoot"), resulting in and entry in the DelegateRegistry of:

Right=Creator; Parent=WarmRoot[W]; Delegate=HotRoot[W];
Contract=AttributeRegistry[SC]

At 3, a Root replace operation is called to replace Warm Root with OthRoot resulting in an entry in the DelegateRegistry:

Right=Creator; Parent=Root[W]; Delegate=OthRoot[W];
Contract=AttributeRegistry[SC]
DelegateRegistry Auto-Update: Right=Creator; Parent=OthRoot[W];
Delegate=WarmerRoot[W]; Contract=AttributeRegistry[SC]

At 4, the right is subsumed by parent supervisory wallet:

DelegateRegistry Remove: Right=Creator; Parent=Root[W];
Delegate=OthRoot[W]; Contract=AttributeRegistry[SC]
Delegate Registry Auto-Update: Right=Creator; Parent=Root[W];
Delegate=WarmerRoot[W]; Contract=AttributeRegistry[SC]

In the disclosed implementations, Hierarchical Wallet Management is used to manage cyber risk of root rights. This mechanism is leveraged for Confederated Rights Management, in the manner described below, where complex rights representing the interests of many parties can be built from base rights that are protected from loss or compromise.

A financial ecosystem depends on many interactions between independent corporate entities, coalitions of entities, and individuals. In a global financial ecosystem with many independent actors and regulatory regimes, authority is not, and cannot be, controlled centrally. Parties may band together into corporations, groups, or other shared enterprises. These parties may link further, usually voluntarily, into confederations, that are loose coalitions without a central authority, to engage in commerce. To scale trusted information exchange in a confederation, participants will often agree on communication methods, common data formats, and rights for participants.

Effective commerce requires a framework that allows entities to define and manage permissions and combine, share, or enforce these rights at scale. A system designed to support the range of entity types and variety of transactions encountered in global commerce must be flexible, expressive, secure (no unauthorized escalation of rights), reversible, and decentralized. Decentralized authority, a core benefit of blockchain, provides a baseline on which a decentralized permission framework for global commerce can be composed.

Disclosed implementations provide a confederated authority framework having a data model that is self-describing, in which rights, which can be expressed as attributes, and the right to define other*, are self-describing and can emerge in a curated manner from an initial exercise of authority. This framework may be used to extend rights to the creation of policies, i.e., expressions of multiple rights that govern actions including the right to create and manage rights and policies. From there, contracts (code or other agreements) can be deployed and managed with desired rights and certifications to enable and automate various transactions with requisite levels of security. Finally, the actions can be linked to units of value, such as tokens, created and managed under the rights framework. Transactions in tokens can be governed by the rights, policies, and contracts that are created within the decentralized framework. A method for establishing a self-describing permission framework to enable confederated authority and the governance of a complex ecosystem starting from a single authority is described below.

The data model for confederated management of rights in accordance with disclosed implementations can include 3 tables/databases: ContextRegistry, AttributeRegistry, and AttestationRegistry. A Context defines a scope of control for 1 or more Attributes. By default, when a Context is created, the Creator holds all rights to update the Context and create and manage attributes and attestations within the Context. These rights may be assigned to other parties using attestations or other methods derived from attributes (policies and or contracts), as described below. An example of code for implementing the ContextRegistry can be found in the Code Appendix Attached hereto. An example data structure of a ContextRegistry record is shown below.

| Id | Name | Creator | SelfSovereign | ParentId |
|---|---|---|---|---|
| 0xabcd | Core | 0x1234 | false | [Null] |

Where:
Id is a unique identifier for a context;
Name is a descriptive name for a context;
CreatorId is the address or other ID of the wallet that created the context;
SelfSovereign indicates that the context cannot be overridden by the System right; and
ParentId is used if a context inherits from another context.

Example code for implementing the AttributeRegistry can be found in the attached Code Appendix. An example data structure for a record in the AttributeRegistry is set forth below.

| Id | Name | ContextId | DataType | ParentId | SourceId |
|---|---|---|---|---|---|
| 0xa1b1 | System | 0xabcd (Core) | Boolean | [Null] | [Internal] |

Where:
Id is a unique identifier for an attribute
Name is a descriptive name for an attribute;
ContextId is the context in which the attribute is accessed and managed;
DataType is the data type for values assigned to the Attribute in the AttestationRegistry or other sources (an enumeration of DataType values can be found in the Code Appendix);
ParentId is used to define inheritance between attributes; and
SourceId defines where data can be found for Attestations involving the Attribute (while the source may be external, third party oracles and/or smart contracts, or other data sources, all examples disclosed herein assume the source is an internal data store, the AttestationRegistry with read and write rules controlled by the Context).

Example code for implementing the AttestationRegistry in accordance with disclosed implementations can be found in the PropertyMetadata portion of the Code Appendix. An example data structure of a record in the AttestationRegistry is set forth below.

| Id | AttributeId | Key | Value | Creator | Expiration |
|---|---|---|---|---|---|
| 0x12ef | 0xa1b1 (System) | 0x5678 (in this case a wallet) | true | 0x1234 | [Null] |

Where:
Id is a unique identifier for an attestation;
AttributeId is the attribute defining the format and purposed of the attestation; Key is the item to which the value is assigned (the key may be a composite key linking more than one item to the value);
Value is the value assigned for the attestation;
Creator identifies the party who set the attestation value; and
Expiration indicates the time when an attestation expires.

Using these data structures, it is possible for a context creator to create attributes representing roles, as described in greater detail below. The roles can be assigned to wallets via an attestation. The creator can assign the attributes (roles) to specific functions used to manage contexts, attributes, and attestations, thereby creating a management structure that manages the management structure, that is, a self-describing, self-managing system that can be used to allow groups to form and manage rights collaboratively.

To establish the self-describing rights framework, a Root authority, a party entrusted to create and operate key elements of the system, deploys a smart contract infrastructure including the ContextRegistry, AttributeRegistry, and AttestationRegistry to instantiate the framework. The deployment of smart contracts to distributed ledgers is a common practice that is well-known to one of skill in the art and thus is not described in detail herein. The Root authority is only expected to be enacted at system initiation unless there is an extraordinary event that requires a reset of basic rights. If a Context is created with the SelfSovereign value set to true, the Root need not be trusted by the creating confederation since the Root (or assigned System right) will not have the right to modify the Context.

After smart contract deployment, the first act of the Root is to sign a transaction to create the 'Core' context in the ContextRegistry. The transaction structure to set data in the designated format within a registry is a common practice known to one of skill in the art and thus is not described in detail herein. Specific function signatures may vary. The Root then signs a transaction to create the 'System' attribute (role) in the Core context. The Root then signs a transaction to create a record in the AttestationRegistry that assigns the value ('true') with a key (0x5678) to the system attribute, thereby assigning the wallet with the address corresponding to the key to the System role.

Using this same sequence, the system account then assigns core authorizers, who act as curators, to ensure that only known and qualified entities perform actions in the system. Since only a wallet containing the designated right within a context can modify the context, the system is designed to prevent rights escalation, or cross entity authorization (an unaffiliated entity assigning rights for another entity).

Figure 4:
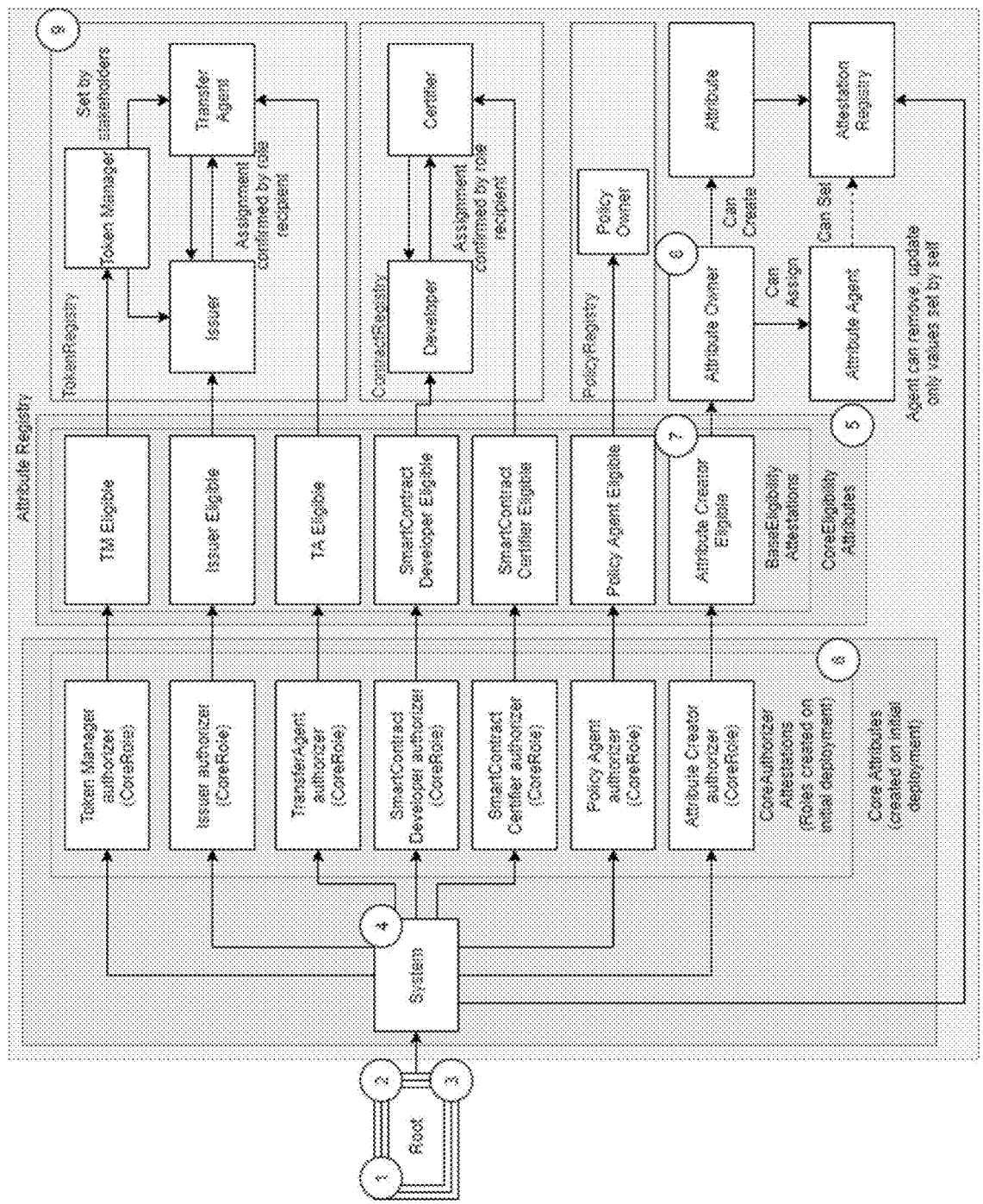
FIG. 4 is a schematic illustration of the smart contract architecture for a full implementation of a confederated rights management system in accordance with disclosed implementations.

FIG. 4 illustrates the smart contract architecture for a full implementation of a confederated rights management system. The architecture consist of a root right, assigned to the party that deploys the framework, and a series of registries used to create and manage rights derived from the root right. The AttributeRegistry allows the creation and management of any role or right, including rights that can be used to govern the infrastructure. The following describes a process for configuration of the infrastructure to enable confederated rights management. For each step of the setup process, Attributes are recorded in the registries as disclosed above and in the Code Appendix. Initially, wallets which will be used to exercise Root, Warm Root, and System functions exist with separate key management at 1. At 2, Root deploys the infrastructure smart contracts (code in appendix) and is recorded as Creator. At 3, Root Delegates to Warm Root thereby assigning ecosystem Creator right and responsibilities (which can be removed by Root) as described in the delegation flows above. At 4, Root creates System Attribute & assigns attestation for wallet performing the System role. The data entries in the ContextRegistry, AttributeRegistry, and AttestationRegistry for this step are shown in the tables and example above. At 5, System creates CoreEligibility Attributes (TokenRoleEligible, AssetRoleEligible, etc.). The data entries for this step follow the same pattern established in the previous step and will not be shown further. Subsequently, at 6, System creates CoreAuthorizer Attribute and makes Attestations for each wallet performing role. At 7, (Usually later) Authorizers assign respective CoreEligibility Attribute Agent rights to desired wallets for each attribute. At 8, Eligible AttributeCreators may create new Attributes which may govern other Roles as desired. At 9, Eligible Creators may create self-sovereign tokens, asset, contracts, and policies and may further assign rights for these entities.

One of the basic actions is the ability to create an attribute (right). Authorized rights creators can create and manage a right. This enables any authorized entity to create and manage its own ecosystem. This framework enables interactions between entities and collective action between unaffiliated entities. A shorthand notation is used to show the data structures that will be created as part of the setup sequence.

Figure 5:
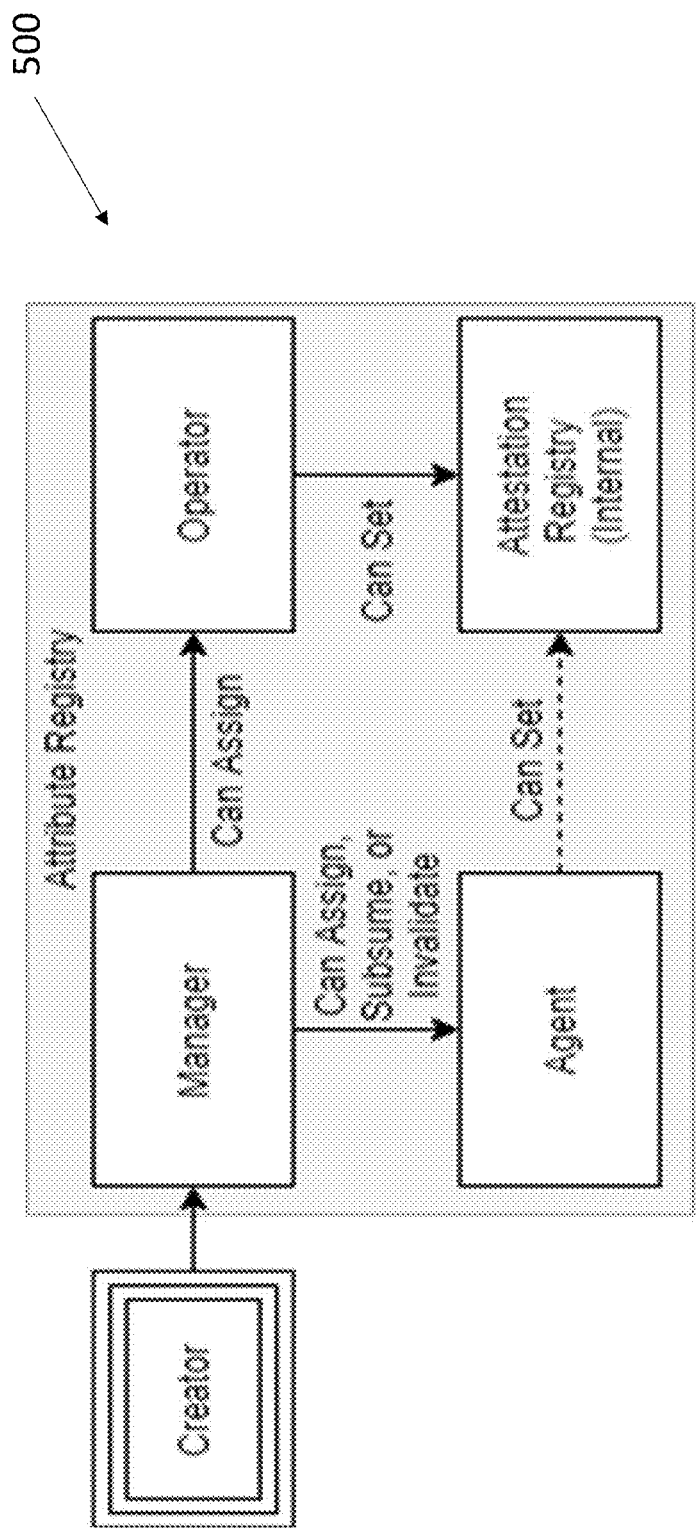
FIG. 5 is a schematic illustration of an example of a rights object 500 in accordance with disclosed implementations.

FIG. 5 illustrates an example of a rights object 500 in accordance with disclosed implementations. A Creator (Core Attribute Attestation) may create a Context through an entry in the ContextRegistry. By default, ContextRegistry has a Policy that a Creator must have the AttributeRoleEligible Creator Attestation (role). To validate the Core Attribute Attestation, the following record can be recorded in the AttributeRegistry.

Attribute=AttributeRoleEligible; Key=Creator[W]; Value=Creator;
    Source=AttributeRoleAuthorizer[W];
    Contract=ContextRegistry[SC]

The context Creator is recorded with the Context entry in the ContextRegistry. This role can be Delegated as described below. On attribute creation, the Manager role is self-assigned by the Creator. In this implementation there can be only one manager for an Attribute. The following record is recorded in the AttributeRegistry.

Attribute=AttributeRole; Key=Attribute[ID], Creator[W]; Value=Manager;
    Source=Creator[W]; Contract=AttributeRegistry On Context creation, the Manager role is self-assigned by the Creator through the following data structure.

Attribute=ContextRole; Key=Context[ID], Creator[W]; Value=Manager;
    Source=Creator[W]; Contract=AttributeRegistry A Context Manager may create one or more Attributes within the context.

On attributed creation, the Operator role is self-assigned by its Creator, the Context Manager, and the following record is recorded in the AttributeRegistry.

Attribute=Attribute; Key=Context[ID], Creator[W]; Value=Operator;
    Source=Creator[W]; Contract=AttributeRegistry The ContextRegistry Creator may assign a Policy which enforces the following rules.

There can be only one Manager for a Context. If the Manager role has been set by the Creator (or Delegates), the Creator (or Delegates) may reassign the Manager.
    If the Context is not self-sovereign (which can be the default), the Manager may be set by the System. The Manager may add or remove AttributeRoles(Operator, Agent).

The Manager may add or remove Operators for Attributes (0 to many) by recording the following record in the AtributeRegistry.

Attribute=AttributeRole; Key=Attribute[ID], Operator[W]; Value=Operator;
    Source=Manager[W]; Contract=AttributeRegistry The Manager may add or remove Agents for the Attribute (0 to many) by recording the following record in the AttributeRegistry.

Attribute=AttributeRole; Key=Attribute[ID], Agent[W]; Value=Agent;
    Source=Manager[W]; Contract=AttributeRegistry By default (assigned at AttestationRegistry setup), the AttestationRegistry has a Policy that Attribute Operators may add, update, or remove any attestation for the attribute. Attribute Agents may only update or remove attributes where they are the Source. Agents or Operators can Set Attestations (values in the AttributeRegistry) for an Attribute. Some attributes use an internal store for values called the AttestationRegistry. Other Attributes point to external data from various sources. A special type of attribute is one that permits self-attestation, that is, an attribute whose value can be set by an affected party, specified as set for the below for example.

[W]=Wallet address, [SC]=Smart Contract address, [ID]=Attribute Identifier

In a similar manner, other actions create basic objects in the system (policies, contracts, entities, and units of value) that can be used to encode participants and any other aspect of financial transactions. Policies are combinations of rules, the rules being statements that evaluate one or more attributes against other data, the rules used to govern smart contact transactions. The structure and function of rules are described in U.S. application Ser. No. 16/143,058 filed on Sep. 26, 2018, the disclosure of which is incorporated herein by reference. Policies are derived from attributes and can be used to compose attributes into rules that can be applied to the creation and management of contexts, attributes, and attestations. This is yet another way that the disclosed data structure can be used to govern itself and allowing for the creation of any management structure used to align a confederation.

Figure 6:
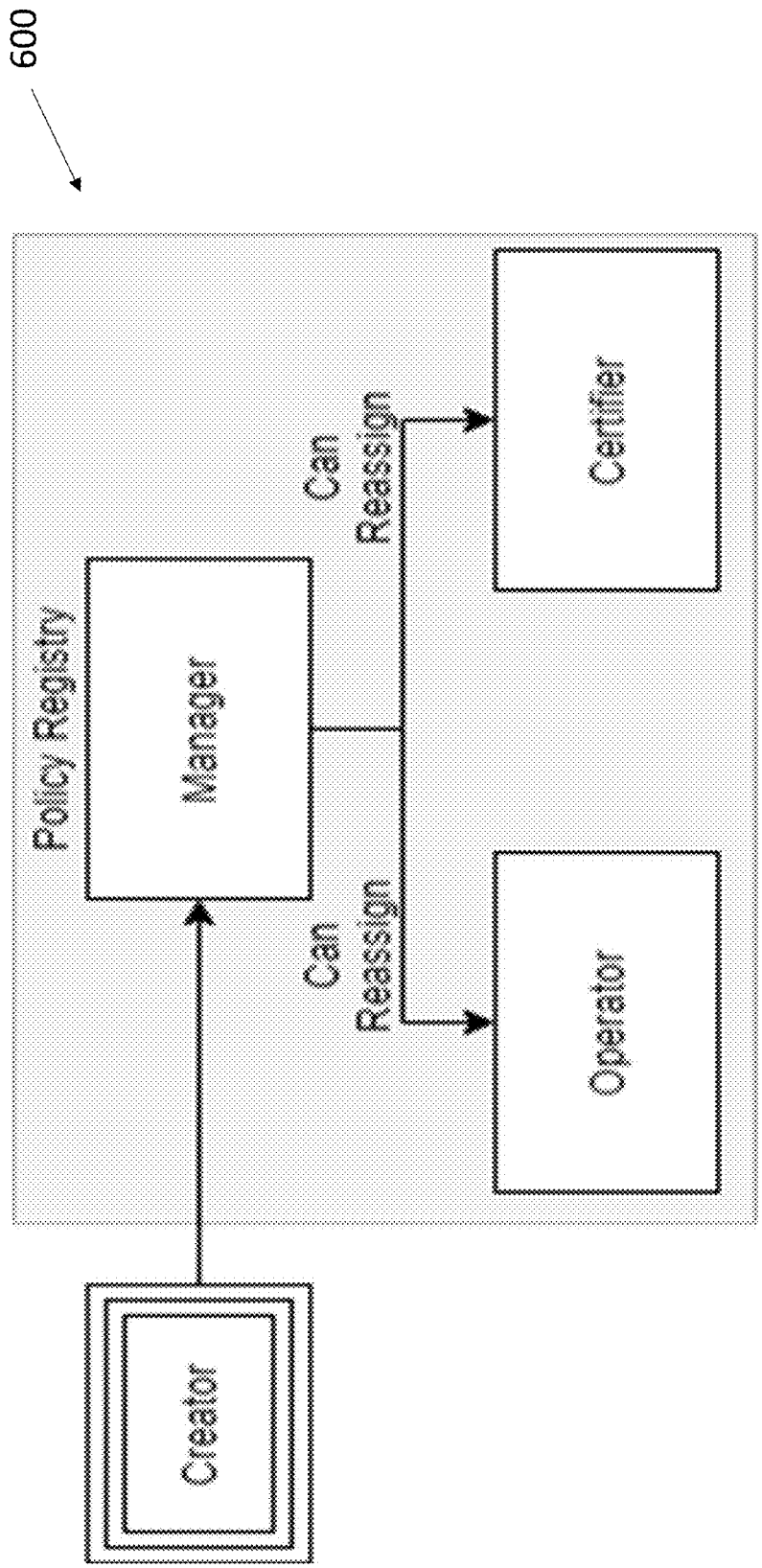
FIG. 6 is a schematic illustration of a policy object in accordance with disclosed implementations.

FIG. 6 illustrates a policy object 600 created by Creator (Core Attribute Attestation0. By default (e.g., assigned at setup), the PolicyRegistry has a Policy that the Creator must have the PolicyRoleEligible Creator Attestation (role), expressed in the following manner for example.

Attribute=PolicyRoleEligible; Key=Creator[W]; Value=Creator;
Source=PolicyRoleAuthorizer[W]; Contract=AttributeRegistry[SC]

The Creator is recorded with the Policy entry in the AttributeRegistry. This role can be Delegated. On Policy object creation, the Manager role is self-assigned by the Creator through the following record.

Attribute=PolicyRole; Key=Policy[ID], Creator[W]; Value=Manager;
Source=Creator[W]; Contract=PolicyRegistry[SC]

The PolicyRegistry can have a Policy (assigned on or after creation) which enforces the rules below.

There can be only one Manager for a Policy;
If the Manager role has been set by the Creator (or Delegates), the Creator (or Delegates) may reassign the Manager
If the Policy is not self-sovereign (which is the default), the Manager may be set by the System; and
The Manager may add or remove PolicyRoles(Operator, Certifier).

On Policy object creation, the Operator and Certifier roles are self-assigned by the Creator through the following records.

Attribute=PolicyRole; Key=Policy[ID], Creator[W]; Value=Operator;
Source=Creator[W]; Contract=PolicyRegistry[SC];
Attribute=PolicyRole; Key=Policy[ID], Certifier[W]; Value=Certifier;
Source=Creator[W]; Contract=PolicyRegistry[SC];

The Manager may assign one or more parties as Operator, at 3, by recording the following.

Attribute=PolicyRole; Key=Policy[ID], Operator[W]; Value=Operator;
Source=Manager[W]; Contract=PolicyRegistry[SC];

There may be only one Certifier for a Policy. If the Certifier is any party other than the Creator, the Certifier must have the PolicyRoleEligible Certifier Attestation (role). The Certifier must acknowledge assignment before the role is applied. The following data structures specify this.

Attribute=PolicyRoleEligible; Key=Certifier[W]; Value=Certifier;
Source=PolicyRoleAuthorizer[W]; Contract=AttributeRegistry[SC]
Attribute=PolicyRole; Key=Policy[ID], Certifier[W]; Value=Certifier;
Source=Manager[W]; Contract=PolicyRegistry[SC];
*[W]=Wallet address, [SC]=Smart Contract address, [ID]=Registry identifier As described above, smart contracts are used to execute logic on distributed ledgers. New smart contracts can be deployed to change the behavior of configured systems including the rights management system disclosed herein. The rights management system can be used to govern permissions to conduct upgrades on the rights management system as described below.

Figure 7:
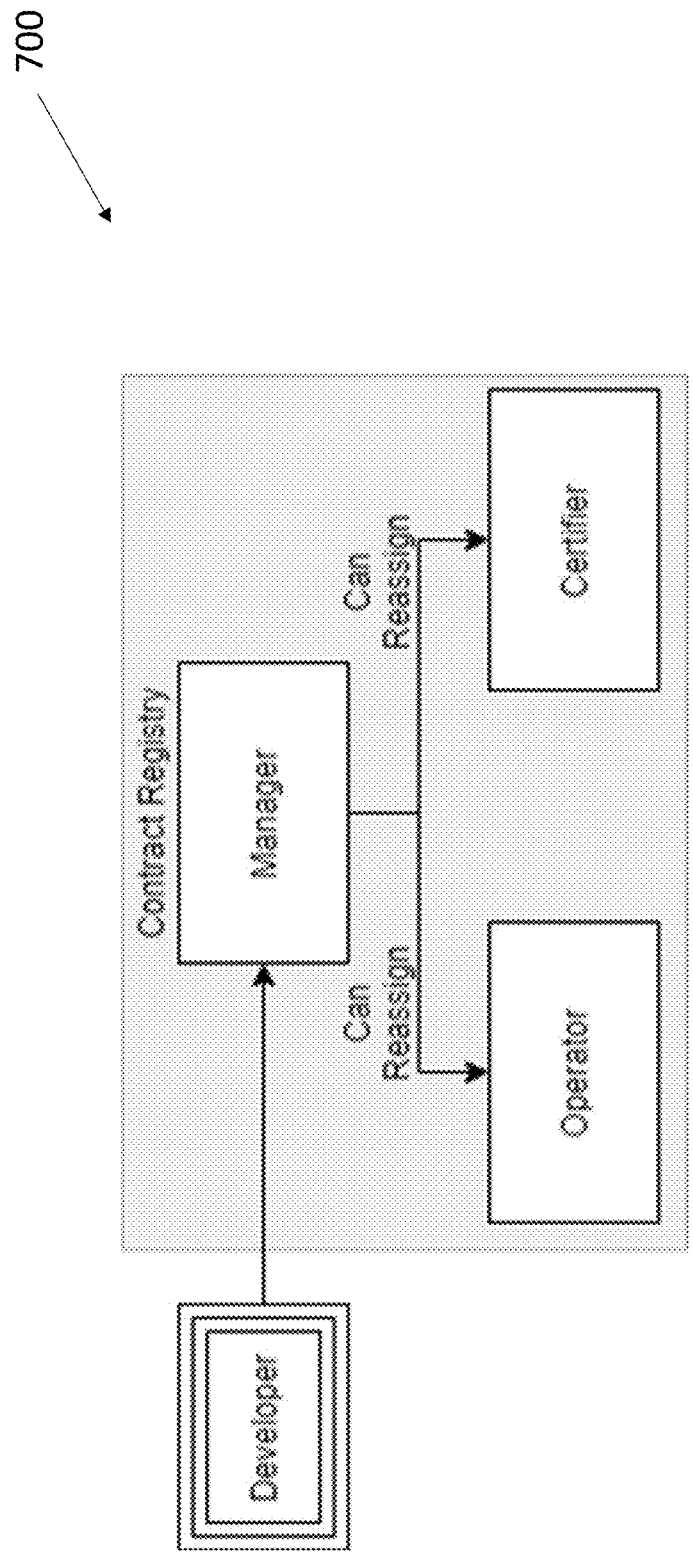
FIG. 7 is a schematic illustration of a smart contract object in accordance with disclosed implementations.

As shown in FIG. 7, a Developer (Core Attribute Attestation) may create a SmartContract object 700. By default (assigned at setup), the ContractRegistry has a Policy that the Developer must have the ContractRoleEligible Developer Attestation (role) specified by the data structure below.

Attribute=ContractRoleEligible; Key=Developer[W]; Value=Developer;
Source=ContractRoleAuthorizer[W]; Contract=AttributeRegistry[SC]

The Developer is recorded with the Contract entry in the Registry. This role can be Delegated. On Contract object creation, the Manager role is self-assigned by the Developer through the following data structure.

Attribute=ContractRole; Key=TokenID[SC], Developer[W]; Value=Manager;
Source=Developer[W]; Contract=ContractRegistry[SC]

The ContractRegistry can have a Policy (assigned on or after creation) which enforces the following rules:

There can be only 1 Manager for a Contract;
If the Manager role has been set by the Developer (or Delegates), the Developer (or Delegates) may reassign the Manager; and
If the Contract is not self-sovereign (which is the default), the Manager may be set by the System. The Manager may add or remove ContractRoles(Operator, Certifier).

On Contract object creation, the Operator and Certifier roles are self-assigned by the Developer through the following data structures.

Attribute=ContractRole; Key=ContractID[SC], Developer[W]; Value=Operator;
Source=Developer[W]; Contract=ContractRegistry[SC]
Attribute=ContractRole; Key=ContractID[SC], Certifier[W]; Value=Certifier;
Source=Developer[W]; Contract=ContractRegistry[SC];

The Manager may assign one or more parties as Operator through the following data structure.

Attribute=ContractRole; Key=ContractID[SC], Operator[W]; Value=Operator;
Source=Manager[W]; Contract=ContractRegistry[SC];

If desired, a creator may deploy a policy which restricts the attribute management system such that be only one Certifier for a Contract. If the Certifier is any party other than the Developer, the Certifier must have the ContractRoleEligible Certifier Attestation (role). The Certifier must acknowledge assignment before the role is applied.

Figure 8:
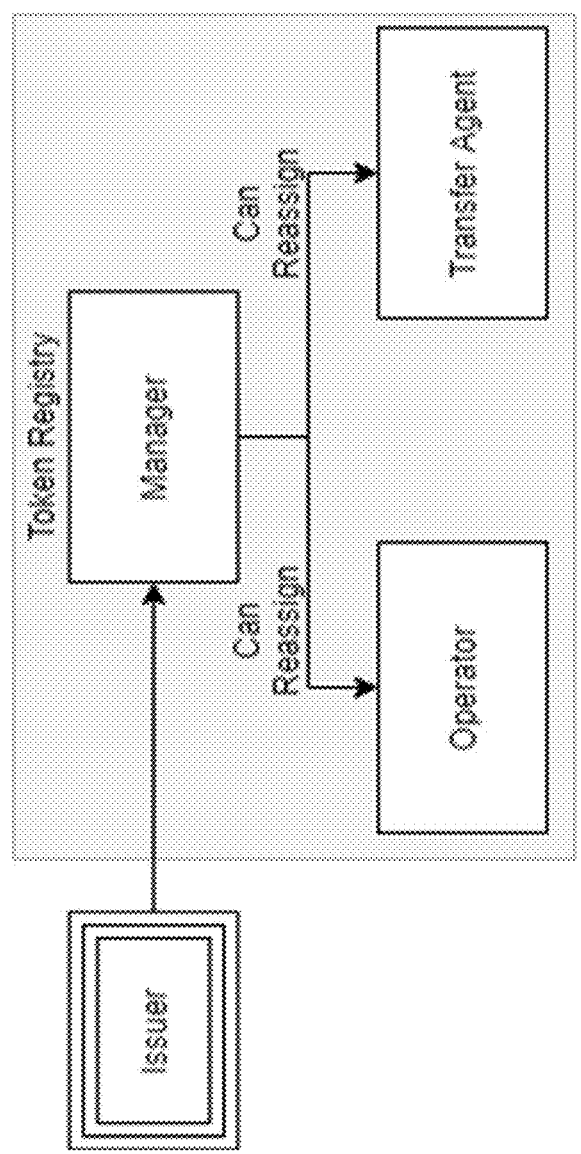
FIG. 8 is a schematic illustration of a token object in accordance with disclosed implementations.

Attribute=ContractRoleEligible; Key=Certifier[W]; Value=Certifier;
Source=ContractRoleAuthorizer[W]; Contract=AttributeRegistry[SC]
Attestation=>Attribute=ContractRole; Key=ContractID[SC], Certifier[W];
Value=Certifier; Source=Manager[W]; Contract=ContractRegistry[SC];
*[W]=Wallet address, [SC]=Smart Contract address Token Registry As illustrated in FIG. 8, an Issuer (Core Attribute Attestation) may create a Token through a Smart Contract 800 defining ownership and/or rights in the token. By default (assigned at setup), the Token Registry has a Policy that the Issuer must have the TokenRoleEligible Issuer Attestation (role) specified through the following data structure.

Validate Attestation=>Attribute=TokenRoleEligible; Key=Issuer[W];
Value=Issuer; Source=TokenRoleAuthorizer[W]; Contract=AttributeRegistry[SC]

The Issuer is recorded with the Token entry in the Registry. This role can be Delegated. On Token creation, the Manager role is self-assigned by the Issuer through the following data structure.

Attribute=TokenRole; Key=TokenID[SC], Issuer[W]; Value=Manager;
Source=Issuer[W]; Contract=TokenRegistry[SC]

The TokenRegistry has a Policy (assigned at creation) which enforces the following rules:

There can be only 1 Manager for a Token;

If the Manager role has been set by the Issuer, the Issuer may reassign the Manager. If the Token is not self-sovereign (which is the default), the Manager may be set by the System;

For a self-sovereign Token, the Manager may be set by an election from tokenholders (Election described separately); and The Manager may add or remove TokenRoles(Operator, TransferAgent).

On Token creation, the Operator and Agent roles are self-assigned by the Issuer through the following data structures.

Attribute=TokenRole; Key=TokenID[SC], Issuer[W]; Value=Operator;
Source=Issuer[W]; Contract=TokenRegistry[SC];
Attribute=TokenRole; Key=TokenID[SC], Issuer[W]; Value=Agent;
Source=Issuer[W]; Contract=TokenRegistry[SC];

The Manager may assign one or more parties as Operator through the following data structure.

Attribute=TokenRole; Key=TokenID[SC], Operator[W]; Value=Operator;
Source=Manager[W]; Contract=TokenRegistry[SC];

In this implementation, there may be only one Transfer-Agent for a Token. If the Agent is any party other than the Issuer, the Agent must have the TokenRoleEligible Agent Attestation (role). The Agent must acknowledge assignment before the role is applied through the following data structures.

Figure 9:
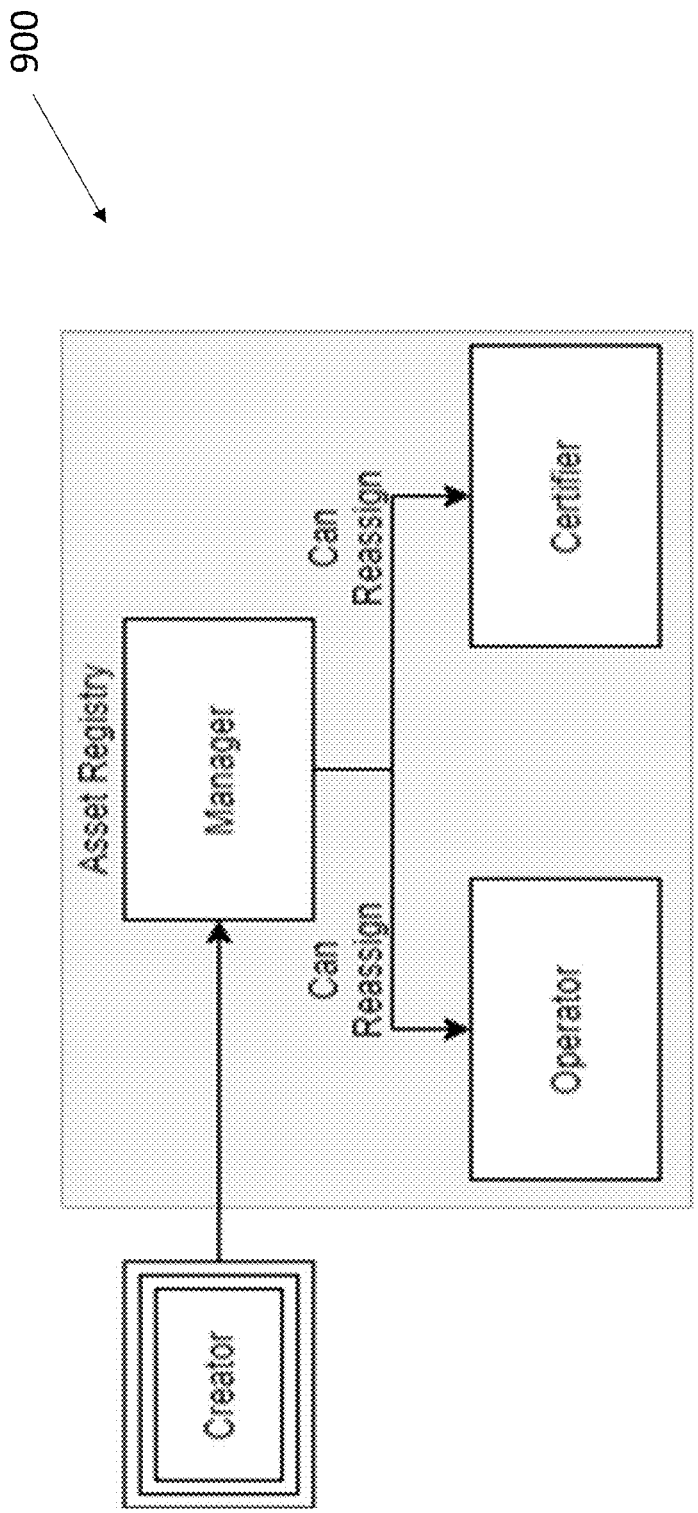
FIG. 9 is a schematic illustration of an asset object in accordance with disclosed implementations.

Attribute=TokenRoleEligible; Key=Agent[W]; Value=Agent;
Source=Token RoleAuthorizer[W]; Contract=AttributeRegistry[SC]
Attribute=TokenRole; Key=TokenID[SC], Agent[W]; Value=Agent;
Source=Manager[W]; Contract=TokenRegistry[SC];
*[W]=Wallet address, [SC]=Smart Contract address As illustrated in FIG. 9, an asset Creator (Core Attribute Attestation) may create an Asset object 900. By default (assigned at or after setup), the AssetRegistry has a Policy that the Creator must have the AssetRoleEligible Creator Attestation (role) as expressed below.

Attribute=AssetRoleEligible; Key=Creator[W]; Value=Creator;
Source=AssetRoleAuthorizer[W]; Contract=AttributeRegistry[SC]

The Creator is recorded with the Asset entry in the AssetRegistry. This role can be Delegated. On Asset creation, the Manager role is self-assigned by the Creator throught the following data structure.

Attribute=AssetRole; Key=Asset[ID], Creator[W]; Value=Manager;
Source=Creator[W]; Contract=AssetRegistry[SC]

The AssetRegistry has a Policy (assigned at or after creation) which enforces the rules below:

There can be only 1 Manager for an Asset;
If the Manager role has been set by the Creator (or Delegates), the Creator (or Delegates) may reassign the Manager; and
If the Asset is not self-sovereign (which is the default), the Manager may be set by the System. The Manager may add or remove AssetRoles(Operator, Certifier).

On Asset creation, the Operator and Certifier roles are self-assigned by the Creator as follows.

Attestation=>Attribute=AssetRole; Key=Asset[ID], Creator[W]; Value=Operator; Source=Creator[W]; Contract=AssetRegistry[SC];
Attestation=>Attribute=AssetRole; Key=Asset[ID], Certifier[W]; Value=Certifier; Source=Creator[W]; Contract=AssetRegistry[SC];

The Manager may assign one or more parties as Operator through the data structure below.

Attribute=AssetRole; Key=Asset[ID], Operator[W]; Value=Operator;
Source=Manager[W]; Contract=AssetRegistry[SC];

If desired, a Creator may deploy a policy which restricts the attribute management system such that there may only be one Certifier for a Contract. If the Certifier is any party other than the Developer, the Certifier must have the ContractRoleEligible Certifier Attestation (role). The Certifier must acknowledge assignment before the role is applied.

Attribute=AssetRoleEligible; Key=Certifier[W]; Value=Certifier;
Source=AssetRoleAuthorizer[W]; Contract=AttributeRegistry[SC]
Attribute=AssetRole; Key=Asset[ID], Certifier[W]; Value=Certifier;
Source=Manager[W]; Contract=AssetRegistry[SC];
*[W]=Wallet address, [SC]=Smart Contract address, [ID]=Registry identifier The framework of the disclosed implementations permits a decentralized (self-forming) policy to regulate the decision of the transfer agent right for a particular token, ensuring for stakeholders that the party given the Transfer Agent right is qualified (has a legal right and is fully aware of responsibilities) and trustworthy. An attribute can be created and managed by the ecosystem stakeholders to assign core authorizers who certify parties to perform key functions such as Token Issuer or Transfer Agent. Stakeholders for a particular token can assign or reassign the Transfer Agent right to parties who have been certified to hold this role.

However, the power of an open-ended framework can be overwhelming to an average participant looking to understand their own rights and the rights of parties who affect the value that they own. If rights are not transparent and accessible, a user may inadvertently participate in transactions where their rights are affected in ways they did not anticipate or understand. The framework includes Strategies, e.g., rights that are bundled into packages that provide common investment patterns. This provides participants a simple model to find rights packages they prefer and feel comfortable with. For example, rights packages can be self-sovereign, managed, and the like.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be its most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for secure authorization of data transactions represented as state changes in a decentralized computing network including a distributed ledger platform, the method comprising:
    creating a root right expressed in a smart contract code executed on the decentralized computing network, the root right permitting execution of specified functions to thereby create an immutable right;
    delegating a right to permit execution of at least one of the specified functions from the root right to a wallet on the decentralized computing network to create a delegated right allowing the wallet to sign transactions corresponding to the at least one of the specified functions, wherein the delegated right is configured to be revoked or reassigned by the root right;
    recording a data structure in a delegation registry that represents the delegated right; and
    authorizing a transaction on the decentralized computing network by signing the transaction with the wallet to thereby exercise the delegated right.

2. The method of claim 1, wherein the smart contract code provides a party with signing authority on an assigning wallet assigned to the root right permission to delegate a second delegated right to a second wallet, thereby creating an extended right, and further comprising recording a second data structure in the delegation registry in response to a delegation of the second delegated right, thereby resulting in the second data structure in the delegation registry referencing at least one smart contract wherein the second delegated right applies, the second delegated right, the assigning wallet, and the second wallet to which the second delegated right was delegated.

3. The method of claim 2, wherein the right, the delegated right, and the extended right are derived directly or indirectly from the root right, to thereby provide a chain of authority configured to be traced back to the root right.

4. The method of claim 1, wherein a smart contract interface specification is used for communication between the smart contract code and the delegation registry.

5. The method of claim 1, wherein a root wallet assigned to the root right is configured to revoke the delegated right by removing the data structure from the delegation registry that represents the delegated right, or replacing delegation of the delegated right by delegating the delegated right to another wallet by changing the data structure in the delegation registry that represents the delegated right.

6. The method of claim 1, further comprising the wallet delegating the delegated right to another wallet to thereby further isolate a root wallet assigned to the root right from cyber risk associated with signing transactions.

7. The method of claim 1, wherein a rights management data structure model is applied whereby new rights are formed from existing rights, wherein the new rights include at least one management right permitting creation, management, and enforcement of the delegated right, the rights management data structure model expressing the at least one management right by deploying a rights management smart contract code that enables a rights management structure, the rights management data structure model being defined by a root wallet.

8. The method of claim 7, wherein the rights management data structure model includes an attribute management registry containing at least one attribute, wherein the at least one attribute is an attribute data structure containing a name, a storage location and data type, and an indication of an authorized party authorized to create, read, update, or delete data and wherein an attestation registry stores attestation attribute values associated with objects assigned by the authorized party, the attestation attribute values representing roles which are configured to be used to capture the delegated right assigned to the wallet, to thereby facilitate the creation and management of a role right configured to be used to govern the delegated right.

9. The method of claim 1, wherein a policy management data structure includes a set of encoded instructions that evaluates one or more rules consisting of logic to use attributes of effected objects in a state change proposed by the wallet to determine a the delegated right of the wallet allowing the wallet to authorize the state change.

10. A computer system for secure authorization of data transactions represented as state changes in a decentralized computing network including a distributed ledger platform, the system comprising:
    at least one computer hardware processor; and
    at least one memory device having computer readable instructions stored thereon which,
        when executed by the at least one computer hardware processor cause the at least
        one computer hardware processor to carry out the following method:
    creating a root right expressed in a smart contract code for execution on the decentralized computing network, the root right permitting execution of specified functions to thereby create an immutable right;

delegating a right to permit execution of at least one of the specified functions from the root right to a wallet on the decentralized network to create a delegated right allowing the wallet to sign transactions corresponding to the at least one of the specified functions, wherein the delegated right is configured to be revoked or reassigned by the root right;

recording a data structure in a delegation registry that represents the delegated right; and authorizing a transaction on the decentralized computing network by signing the transaction with the wallet to thereby exercise the delegated right.

11. The system of claim 10, wherein the smart contract code provides a party with signing authority on an assigning wallet assigned to the root right permission to delegate a second delegated right to a second wallet, thereby creating an extended right, and further comprising recording a second data structure in the delegation registry being accomplished in response to a delegation of the second delegated right resulting in the second data structure in the delegation registry referencing at least one smart contract wherein the second delegated right applies, the second delegated right, the assigning wallet, and the second wallet to which the second delegated right was delegated.

12. The system of claim 11, wherein the right, the delegated right, and the extended right are derived directly or indirectly from the root right, to thereby provide a chain of authority configured to be traced back to the root right.

13. The system of claim 10, wherein a smart contract interface specification is used for communication between the smart contract code and the delegation registry.

14. The system of claim 10, wherein a root wallet assigned to the root right is configured to revoke the delegated right by removing the data structure from the delegation registry that represents the delegated right, or replacing the delegation of the delegated right by delegating the delegated right to another wallet by changing the data structure in the delegation registry that represents the delegated right.

15. The system of claim 10, further comprising the wallet delegating the delegated right to another wallet to thereby further isolate a root wallet assigned to the root right from cyber risk associated with signing transactions.

16. The system of claim 10, wherein a rights management data structure model is applied whereby new rights are formed from existing rights, wherein the new rights include at least one management right permitting creation, management, and enforcement of the delegated right, the rights management data structure model expressing the at least one management right to authorize a state change by deploying a rights management smart contract code that enables a rights management structure, the rights management data structure model being defined by a party possessing the root wallet.

17. The system of claim 16, wherein the rights management data structure model includes an attribute management registry containing at least one attribute, wherein the at least one attribute is an attribute data structure containing a name, a storage location and data type, and an indication of an authorized party authorized to create, read, update, or delete data and wherein an attestation registry stores attestation attribute values associated with objects assigned by the authorized party, the attestation attribute values representing roles which are configured to be used to capture the delegated right assigned to the wallet, to thereby facilitate the creation and management of a role right configured to be used to govern the delegated right.

18. The system of claim 10, wherein a policy management data structure includes a set of encoded instructions that evaluates one or more rules consisting of logic to use attributes of effected objects in a state change proposed by the wallet to determine a delegated right of the wallet allowing the wallet to authorize the state change.

19. A computer system for secure authorization of data transactions represented as state changes in a decentralized computing network including a distributed ledger platform, the system comprising:

at least one computer hardware processor;

a root right expressed in a smart contract code; and at least one memory device having computer readable instructions stored thereon which are configured to be executed by the at least one computer hardware processor;

wherein the root right expressed in the smart contract code is executed on the decentralized computing network, wherein the root right permits execution of specified functions to thereby create an immutable right;

wherein a right to permit execution of at least one of the specified functions is configured to be delegated from the root right to a wallet on the decentralized network to create a delegated right, wherein the wallet is configured to sign transactions corresponding to the at least one of the specified functions, wherein the delegated right is configured to be revoked or reassigned by the root right;

wherein a data structure is recorded in a delegation registry that represents the delegated right; and wherein the wallet is configured to authorize a transaction on the decentralized computing network by signing the transaction with the wallet.

20. The system of claim 19, wherein the smart contract code provides a party with signing authority on an assigning wallet assigned to the root right permission to delegate a second delegated right to a second wallet, thereby creating an extended right, and further comprising recording a second data structure in the delegation registry being accomplished in response to a delegation of the second delegated right resulting in the second data structure in the delegation registry referencing at least one smart contract wherein the second delegated right applies, the second delegated right, the assigning wallet, and the second wallet to which the second delegated right was delegated.

\* \* \* \* \*